United States Patent [19]
Tominaga et al.

[11] Patent Number: 5,470,628
[45] Date of Patent: Nov. 28, 1995

[54] OPTICAL RECORDING MEDIUM

[75] Inventors: Junji Tominaga; Susumu Haratani; Tokuhiko Handa; Ryo Inaba, all of Nagano, Japan

[73] Assignee: TDK Corporation, Tokyo, Japan

[21] Appl. No.: 340,340

[22] Filed: Nov. 14, 1994

[30] Foreign Application Priority Data

Dec. 13, 1993 [JP] Japan .................................. 5-341818

[51] Int. Cl.⁶ ..................................................... B32B 3/00
[52] U.S. Cl. ........................ 428/64.4; 428/913; 430/270; 430/945; 369/283; 369/288; 346/137; 347/264
[58] Field of Search ............................... 428/64, 65, 457, 428/913; 430/270, 945; 346/76 L, 137; 369/283, 288

[56] References Cited

U.S. PATENT DOCUMENTS

| 5,018,119 | 5/1991 | Aratani et al. | 369/13 |
| 5,147,701 | 9/1992 | Furukawa | 428/64 |
| 5,153,873 | 10/1992 | Spruit et al. | 369/275.2 |
| 5,389,417 | 2/1995 | Tominaga | 428/64 |
| 5,418,030 | 5/1995 | Tominaga | 428/64 |

FOREIGN PATENT DOCUMENTS

| 03082593 | 4/1991 | Japan . |
| 03099884 | 4/1991 | Japan . |
| 03240590 | 10/1991 | Japan . |

OTHER PUBLICATIONS

Optical Storage Readout of Nonlinear Disks; Bouwhuis et al; Applied Optics; Sep. 10, 1990; pp. 3766–3768.
Premastered Optical Disk by Superresolution; Yasuda et al; Optical Memory Symposium; 1993; pp. 65 & 66.
Magentically Induced Super Resolution in Novel Magneto Optical Disk; Aratani et al; Optical Data Storage; 1991; SPIE vol. 1499; pp. 209–215.

Primary Examiner—Patrick J. Ryan
Assistant Examiner—Elizabeth Evans
Attorney, Agent, or Firm—Watson, Cole, Grindle & Watson

[57] ABSTRACT

An optical recording medium has a mask layer 4, an intermediate dielectric layer 5, a recording layer 6, and a reflective layer 8 on a transparent substrate 2. The recording layer 6 contains a recording material which changes its crystallographic structure upon exposure to recording light for recording information. The mask layer 4 contains a mask material which increases its light transmittance when melted and has a complex refractive index $(n_0-ik_0)$, of which the real part $n_0$ drops by 1.0 or less and the imaginary part $k_0$ drops by 0.25–1.0 when the mask material converts from a crystalline state to an amorphous or microcrystalline state. Signals can be reproduced from the medium with high C/N without resorting to reading light of shorter wavelength or an optical pickup objective lens having a larger numerical aperture and even when the linear velocity of the medium relative to recording and reproducing light is low.

20 Claims, 2 Drawing Sheets

RECORDING AND REPRODUCING LIGHT

RECORDING AND REPRODUCING LIGHT

RECORDING LIGHT

REPRODUCING LIGHT

OPTICAL RECORDING MEDIUM

BACKGROUND OF THE INVENTION

1. Field of the Invention

This invention relates to an optical recording medium capable of recording and erasing information by utilizing a change in the crystallographic structure of a recording layer and more particularly, to such an optical recording medium which is increased in track density and linear recording density.

2. Prior Art

Highlight is recently focused on optical recording media which can record information at a high density and erase the recorded information for rewriting. One typical rewritable optical recording medium is of phase change type wherein laser light is directed to the recording layer to change its crystallographic structure whereupon a concomitant change of reflectivity is detected. Optical recording media of the phase change type are of great interest because either recording or erasing may be chosen upon irradiation of a light beam simply by changing the intensity thereof, apparent overwrite recording is then possible with the use of a single light beam, and the drive unit has a simple optical system as compared with that of magnetooptical recording media.

Optical recording media of the phase change type can form small, sharp recorded marks owing to a so-called "self-sharpening effect" without a need for altering the drive unit optical system. More particularly, a recording light beam defines a spot on the recording layer surface. The beam spot has a higher cooling rate near its center where the temperature is higher and heat readily diffuses, but has a slower cooling rate near its periphery where the temperature is lower and thermal diffusion from the beam spot center comes over. This permits only the material near the beam spot center to be converted into an amorphous state by using recording light of an appropriate power. Consequently small, sharp recorded marks can be formed without reducing the wavelength of recording light, allowing for high density recording. This is often referred to as the self-sharpening effect. This is in contrast to magneto-optical recording media, for example, wherein no small recorded marks can be formed by utilizing differential cooling rates within a recording light irradiated spot because the recording layer is heated only to a low temperature below 200° C. during recording.

Although optical recording media generally allow for high density recording, higher density recording is now required for recording of images. To increase the recording density per unit area, two approaches are contemplated, one being to narrow the pitch between recording tracks and the other being to reduce the spacing between record marks for increasing a linear record density. Optical recording media generally include grooves in the substrate surface for tracking purposes, and record marks are formed within the grooves. In the former approach of narrowing the track pitch, the grooves must also be reduced in width. If the optical system of the recording device is not altered, then the beam spot of recording light would have a larger diameter than the groove width and the resulting record mark would extend over an adjacent land between the grooves. If signals are reproduced from the thus recorded optical recording medium using reading light having a large beam spot diameter like the recording light, the influence of light reflected from the land would increase noise. A solution to this problem is to set the groove depth to ⅛ to ⅙ of the wavelength of reading light to induce a sufficient interference to minimize the influence of reflected light from the land. This solution, however, has a problem that deeper grooves lead to a loss of reflectivity, which in turn, leads to a loss of signal intensity, failing to provide high C/N. The latter approach of reducing the bit spacing has a problem that if the beam spot diameter defined in the recording layer by reading light is left unchanged from the conventional one, the beam spot would pick up information from a record mark disposed adjacent the spot in a scanning direction. The noise from the adjacent record mark leads to low C/N.

For preventing C/N drops upon reading of optical recording media having an increased track density or linear record density, the reading light should be reduced in beam spot diameter. This might be accomplished by reducing the wavelength of reading light or by increasing the numerical aperture of an objective lens in the optical pickup. Undesirably, both are technically difficult. Therefore, it is desired to improve C/N without resorting to reading light of shorter wavelength or an objective lens having a larger numerical aperture.

For recording of digital images containing a large quantity of information bits, not only high density recording, but also long time recording are necessary. For long time recording, the relative linear velocity of the medium relative to recording light must be low. If a longer record mark is consequently formed, an irradiation terminating or trailing zone can be sequentially, though slightly, heated due to the influence of an adjacent irradiated spot, resulting in slow cooling. Then the mark is not evenly converted into an amorphous state, failing to provide high C/N and good repetitive record properties. Under such circumstances, it is desired to prevent C/N drops in low-linear velocity recording.

SUMMARY OF THE INVENTION

An object of the present invention is to provide an optical recording medium having a high recording density which allows for signal reproduction with high C/N without resorting to reading light of shorter wavelength or an optical pickup objective lens having a larger numerical aperture.

Another object is to provide such an optical recording medium which is prevented from C/N drops in low-linear velocity recording.

According to the present invention, there is provided an optical recording medium comprising a mask layer, an intermediate dielectric layer, a recording layer, and a reflective layer on a transparent substrate in the described order. The recording layer contains a recording material which changes its crystalline structure upon exposure to recording light for thereby recording information. The mask layer contains a mask material which increases its light transmittance when melted. The mask layer has a complex refractive index ($n_0 - ik_0$), of which the real part $n_0$ has a drop of up to 1.0 and the imaginary part $k_0$ has a drop of 0.25 to 1.0 when the mask material becomes amorphous or microcrystalline.

The minimum of a relative linear velocity at which a material can convert to an amorphous or microcrystalline state after exposure to a light beam is designated a non-crystallizing linear velocity. In one preferred embodiment, the non-crystallizing linear velocity of the mask layer is higher than the non-crystallizing linear velocity of the recording layer; and the relative linear velocity of the medium relative to recording and reproducing light is less than the non-crystallizing linear velocity of the mask layer.

The non-crystallizing linear velocity of the recording layer is preferably 2.4 to 4.5 m/s.

Preferably the mask material contains A, B, C, MI, and MII wherein A is at least one of silver and gold, B is indium, C is at least one of tellurium and selenium, MI is at least one of antimony and bismuth, and MII is at least one element selected from the group consisting of titanium, zirconium, hafnium, vanadium, niobium, tantalum, manganese, tungsten and molybdenum. The atomic ratio of the respective elements in the mask material is represented by the formula:

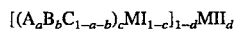

wherein $0.01 \leq a < 0.50$, $0.01 \leq b < 0.50$, $0.30 \leq c \leq 0.70$, and $0.001 \leq d \leq 0.20$. The mask layer may further contain a dielectric material. Desirably, the dielectric material occupies up to 25% by volume of the total of the mask and dielectric materials in the mask layer.

Preferably the recording material contains A, B, C, MI, and MII which are as defined above. The atomic ratio of the respective elements in the recording material is represented by the formula:

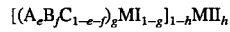

wherein $0.01 \leq e < 0.50$, $0.01 \leq f < 0.50$, $0.30 \leq g \leq 0.70$, and $0.001 \leq h \leq 0.20$. The recording layer may further contain a dielectric material. Desirably, the dielectric material occupies up to 25% by volume of the total of the recording and dielectric materials in the recording layer.

The optical recording medium may further include a lower dielectric layer between the transparent substrate and the mask layer. Typically the lower dielectric layer has a thickness of $[\lambda_R/(2n_3)] \pm 50$ nm wherein the reproducing light has a wavelength $\lambda_R$ and the lower dielectric layer has a refractive index $n_3$. The optical recording medium may further include an upper dielectric layer between the recording layer and the reflective layer, and a protective layer containing an organic material on the reflective layer.

The optical recording medium wherein the recording layer includes an unrecorded region which is crystalline and recorded marks which are amorphous or microcrystalline is referred to as a first type of medium. The optical recording medium wherein the recording layer includes an unrecorded region which is amorphous or microcrystalline and recorded marks which are crystalline is referred to as a second type of medium.

DETAILED DESCRIPTION OF THE INVENTION

Figure 1:
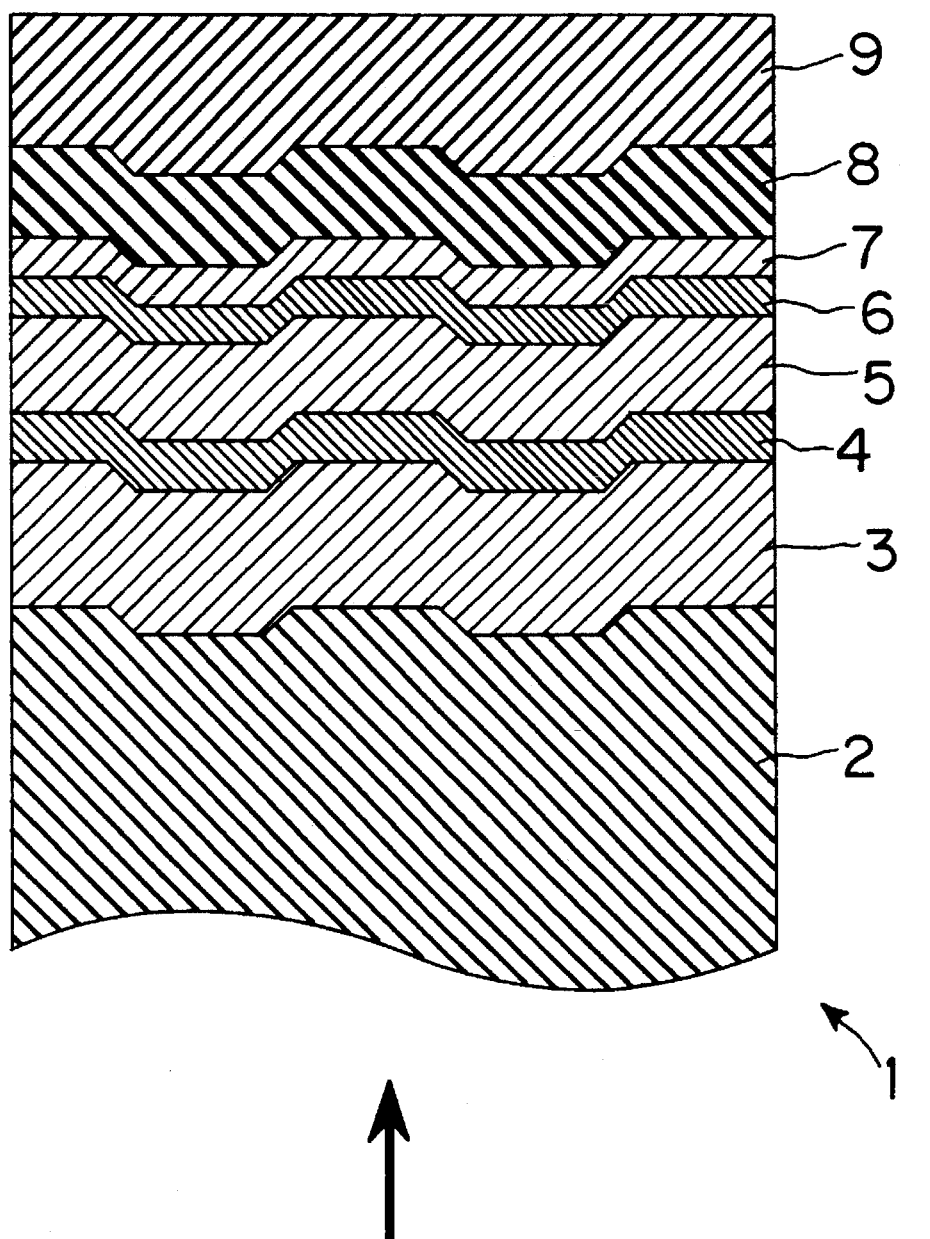
FIG. 1 is a fragmental cross-sectional view of one exemplary arrangement of an optical recording medium according to the present invention.

Referring to FIG. 1, there is illustrated an optical recording medium according to one preferred embodiment of the invention. The optical recording medium generally designated at 1 is illustrated as comprising on a transparent substrate 2, a lower dielectric layer 3, a mask layer 4, an intermediate dielectric layer 5, a recording layer 6, an upper dielectric layer 7, a reflective layer 8, and a protective layer 9. Since the substrate 2 is generally grooved in a spiral fashion, grooves and lands are alternately arranged in a lateral direction in all of the layers.

Function and Advantage

More particularly, the optical recording medium of the invention has the mask layer 4 and the recording layer 6 of the phase change type separated by the intermediate dielectric layer 5. Recording and reading light is irradiated from the mask layer 4 side as shown by a solid arrow in FIG. 1.

The present invention is applicable to both a first type of optical recording medium wherein crystalline unrecorded portions are converted into an amorphous or microcrystalline state to define record marks and a second type of optical recording medium wherein amorphous or microcrystalline unrecorded portions are converted into a crystalline state to define record marks. The invention is best suited for the first type.

The first type of optical recording medium is described with respect to recording, reproducing and erasing steps. First the recording layer 6 which is amorphous as deposited is crystallized by heating with light from a DC laser for melting, followed by cooling. When the recording layer 6 crystallizes in this way, the mask layer 4 also crystallizes. This crystallization is generally referred to as initialization. At this point, it is unnecessary to crystalline each layer over its entirety. It suffices to crystallize at least a region of the recording layer 6 assigned for recording and a region of the mask layer 4 disposed immediately below the assigned region. The mask layer 4 is substantially opaque to reading light when it is crystalline.

Figure 2:
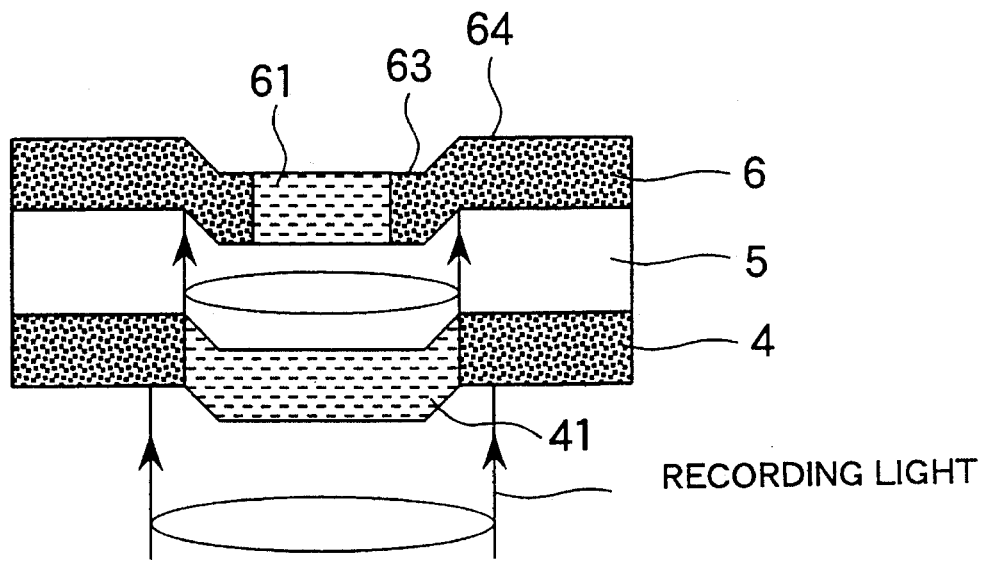
FIG. 2 is a diagrammatic view of a portion of the optical recording medium for illustrating recording functions.
Figure 3:
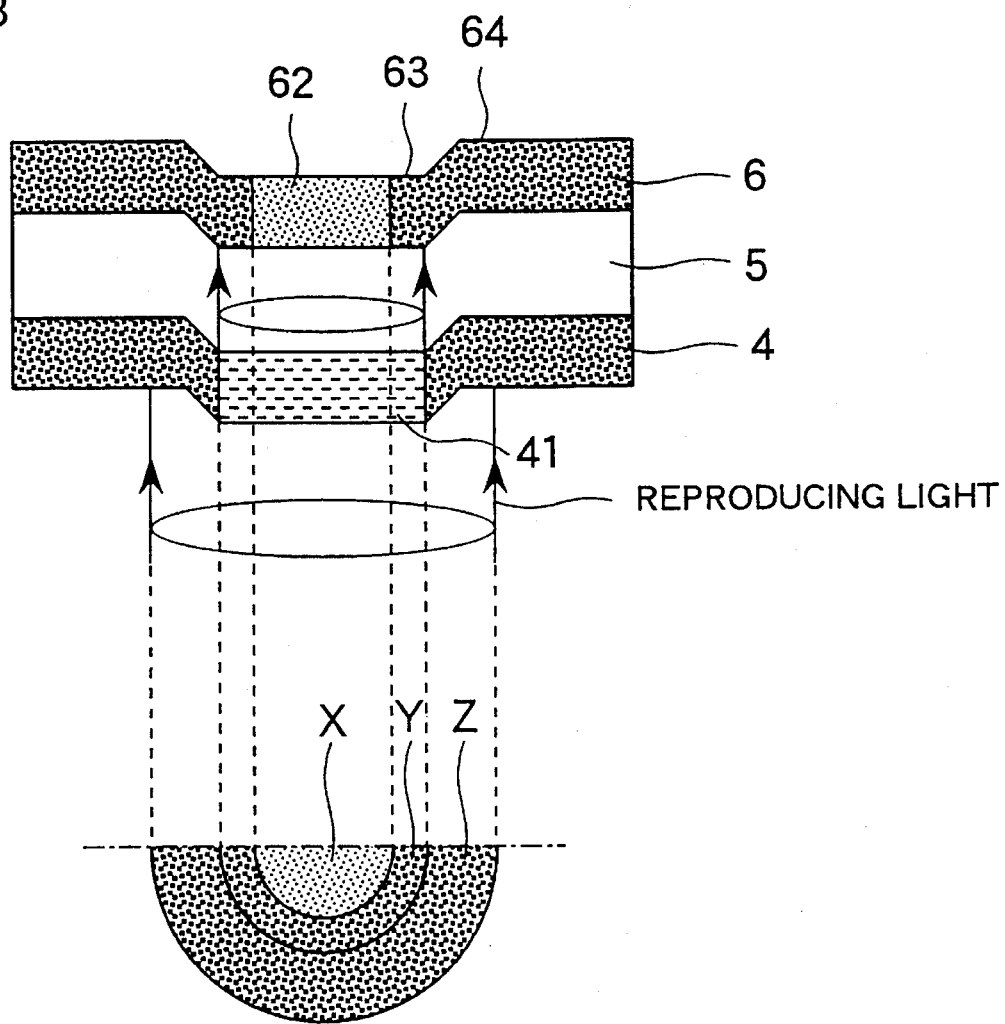
FIG. 3 is a diagrammatic view of a portion of the optical recording medium for illustrating reading functions.

FIG. 2 schematically illustrates the functions associated with recording. The light used for recording should have a sufficient power to melt the mask and record layers 4 and 6. Where recording light is irradiated, the mask layer 4 is melted to form a melt 41 which is substantially transparent to recording light. A beam spot of recording light is transmitted by the melt 41 of the mask layer 4 to the recording layer 6 where the recording layer 6 is melted to form a melt 61. The recording layer 6 has a rapid quench structure since the recording layer 6 adjoins the reflective layer 8 having a high heat transfer rate directly or through the thin upper dielectric layer 7. In contrast, the mask layer 4 has a slow cooling structure since the mask layer 4 adjoins at one surface the intermediate dielectric layer 5 and at the other surface the lower dielectric layer 3 or transparent substrate 2, the dielectric layers and the substrate all having a low heat transfer rate. Consequently, after a beam spot of recording light is moved past, the melt 61 of the recording layer 6 is rapidly quenched to forman amorphous or microcrystalline record mark 62 as shown in FIG. 3. In the mask layer 4 having a slow cooling rate, on the other hand, the melt 41 is slowly cooled to resume a crystalline state.

The recording light beam spot has an intensity distribution in a plane of irradiation to ensure that the mask and record layers 4 and 6 are melted in proximity to the center of the beam spot. Therefore, by using recording light of an appropriate power, a record mark sized smaller than the beam spot diameter can be formed. It will be understood that although the record mark 62 is formed within the groove 63 of the recording layer 6 in FIG. 2, the record mark may extend up to a land 64 of the recording layer 6.

FIG. 3 schematically illustrates the functions associated with reading. The light used for reading should have a sufficient power to melt only the mask layer 4, but not the recording layer 6. As shown in the figure, the melt 41 of the mask layer 4 is sized smaller than the beam spot diameter of reading light. The melt 41 is increased in light transmittance so that the reading light is transmitted by the melt 41 to the record mark 62 in the recording layer 6. The lower portion of FIG. 3 schematically shows a region around the record mark at this point as viewed from the bottom (the transparent substrate 2 side). In the figure, a zone X corresponds to the record mark 62, a zone Y corresponds to the crystalline region of the recording layer 6, and a zone Z corresponds to the crystalline region of the mask layer 4, all the zones schematically representing the reflection images by the reading light transmitted by the transparent substrate and respective layers. Since the melt 41 formed by the reading light has a smaller diameter than the beam spot of reading light and since the mask layer 4 resumes a crystalline state immediately after the beam spot of reading light is moved past, the influence of crosstalk noise by an adjacent record mark is avoided.

The mask layer 4 has a complex index of refraction $(n_0-ik_0)$. On melting, the imaginary part $k_0$ changes, but the real part $n_0$ changes little. Then the reading light transmitted by the melt 41 of the mask layer 4 undergoes little change in phase. Therefore, there is little difference in reflectance between the zones Y and Z and only the reflectance of the zone X is low, which ensures correct readout. This results in a high C/N and a low jitter. On the contrary, if the melt 41 experiences a substantial change of $n_0$, then the reading light transmitted by the melt 41 of the mask layer 4 undergoes a substantial change in phase to bring out a drop of the reflectance of zone Y. As a result, the difference in reflectance between the zones Y and Z is increased and the difference in reflectance between the zones Y and X is reduced. Then the reading device mistakes the zone Y for a record mark, resulting in increased noise and jitter.

Note that FIGS. 2 and 3 diagrammatically illustrate one exemplary arrangement of layers while the configuration and size of the melt regions of respective layers and the record mark are not limited thereto.

Next the erasing step is described. The light used for erasing should have a power lower than the recording light, but higher than the reading light. Upon irradiation, erasing light causes the mask layer 4 to be melted and the recording layer 6 to raise its temperature. Since the temperature reached by the recording layer 6 upon erasing is lower than that associated with the recording step, the recording layer 6 is cooled at a slower rate than in the recording step. Then after removal of erasing light, the recording layer 6 becomes crystalline.

In the first type of optical recording medium, the mask material and the recording material are selected such that the mask layer may have a higher non-crystallizing linear velocity than the recording layer. The term "non-crystallizing linear velocity" used herein is the minimum of a relative linear velocity at which a material can convert to an amorphous or microcrystalline state after illumination. Larger crystals will grow at a lower linear velocity than the non-crystallizing linear velocity. The relative linear velocity of the medium relative to the recording light is set to be equal to or higher than the non-crystallizing linear velocity of the recording layer, but lower than the non-crystallizing linear velocity of the mask layer. This setting makes it possible to form amorphous or microcrystalline record marks in the recording layer and to crystallize the mask layer.

In the first type of optical recording medium, recording, reading and erasing can be performed as well as overwrite recording with the use of a single light beam simply by modulating the intensity of laser light to power levels requisite for recording, reading and erasing.

Described next is the second type of optical recording medium wherein record marks are crystalline. Also in the second type, the mask layer and the recording layer are melted upon recording. In the second type, however, the upper dielectric layer 7 is made thick or the reflective layer 8 is made thin for reducing the cooling rate of the recording layer. Alternatively, the recording layer is formed of a material having a relatively high crystal transition rate so that the recording layer may crystallize after it is melted. The term "crystal transition rate" used herein means the rate at which an amorphous or microcrystalline material grows into coarse crystals. In the reading step, the record mark is read out by the same procedure as in the first type. For erasing the record mark in the recording layer 6, the second type requires a phase change from the crystalline phase to the amorphous or microcrystalline phase. Consequently, a laser beam of higher power must be irradiated as the erasing light in order to increase the cooling rate upon erasing. Then adjacent record marks can be affected upon erasing. Therefore, in a substantial sense, the second type should be used as write-once optical recording media. The second type is difficult to rewrite as mentioned above, but does not require initialization of the recording layer.

In the second type of optical recording medium, the non-crystallizing linear velocity of the mask layer and recording layer is not particularly limited. Differently stated, the second type allows for a choice of a linear velocity such that both the layers may crystallize upon recording and a linear velocity lower than the non-crystallizing linear velocity of the mask layer may be selected for reading.

In one preferred embodiment of the invention, the mask layer contains a mask material having an atomic composition: $[(A_aB_bC_{1-a-b})_cMI_{1-c}]_{1-d}MII_d$, and optionally, an amount of a dielectric material. This composition ensures that the mask layer changes its complex index of refraction within the above-defined range.

In a further preferred embodiment of the first type of optical recording medium according to the invention, the recording layer uses a recording material of a composition similar to the mask material mentioned just above. This recording material has a slow crystal transition rate, that is, it is unlikely to crystallize even at a slow cooling rate. This restricts a lowering of C/N which is otherwise a problem when longer record marks are formed at a low linear velocity. As a result, good C/N is available upon high density, long time recording. The recording material well matches with the above-mentioned mask material which requires to reduce the linear velocity for re-crystallization to take place. Owing to the above-mentioned fact that the recording layer is disposed nearer to the reflective layer and has a higher cooling rate than the mask layer, even when the recording material having a crystal transition rate equal to that of the mask material is used, it is possible to form amorphous record marks and recrystallize the mask layer because the non-crystallizing linear velocity of the recording layer is slower than that of the mask layer.

It is understood that the above-mentioned mask and record materials belong to a $(Ag,Au)In(Te,Se)_2-(Sb,Bi)$ system utilizing chalcopyrite type compounds. Chalcopyrite type compounds were investigated as compound semiconductor materials and have been applied to solar batteries and the like. The chalcopyrite type compounds have a composition: $Ib-IIIb-VIb_2$ or $IIb-IVb-Vb_2$ as expressed in terms of the Groups of the Periodic Table and a structure of two stacked diamond structures. The structure of chalcopyrite type compounds can be readily determined by X-ray structural analysis and their basic characteristics are described, for example, in Physics, Vol. 8, No. 8 (1987), pp. 441 and Electrochemistry, Vol. 56, No. 4 (1988), pp. 228.

Among the chalcopyrite type compounds, $AgInTe_2$ is known to be applicable, by diluting it with Sb or Bi, as a recording material in optical recording media operated at a linear velocity of about 7 m/s. See Japanese Patent Application Kokai (JP-A) No. 240590/1991, 99884/1991, 82593/1991, and 73384/1991. More particularly, JP-A 240590/1991 discloses an information recording medium having a recording layer predominantly comprising $(AgInTe_2)_{1-a}M_a$ wherein M is Sb and/or Bi and $0.30 \leq a \leq 0.92$ and having a mixture of $AgInTe_2$ and M phases. The alleged advantages include improvements in laser writing sensitivity, erasing sensitivity, recording/erasing repeatability and erasing ratio. However, it is not known in the art to use a chalcopyrite type compound as the mask material by controlling a change of its complex index of refraction.

JP-A 89511/1993, 109117/1993 and 109119/1993 disclose optical discs comprising a transparent substrate having optically readable record pits formed therein and a material layer thereon which changes its reflectance with temperature. These optical discs are read-only optical discs having information carried in phase pits. The material layer achieves a high resolution beyond the limit given by the wavelength λ of reading light and the numerical aperture NA of an objective lens, in a similar fashion to the mask layer of the present invention.

However, these publications refer nowhere to a change of a complex index of refraction upon melting of the material layer. JP-A 89511/1993 discloses an optical disc having a layer of $Sb_2Se_3$ phase change material sandwiched between two dielectric layers. A C/N ratio of 25 dB is reported in Example wherein signals are reproduced at a reproduction power of 9 mW and a linear velocity of 3 m/s. It is difficult for the $Sb_2Se_3$ material layer to achieve a higher C/N. Since $Sb_2Se_3$ has a complex index of refraction which is about 1/10 of conventional phase change materials, its thickness must substantially exceed 100 nm in order that it be fully effective as a mask layer. With such a thick mask layer, a melt formed by irradiation of a light beam has a lower index of refraction near the center thereof and a higher index of refraction near the periphery thereof, functioning as a concave lens. Due to this divergence, the light beam is increased in diameter, failing to provide high C/N. The remaining phase change materials exemplified in this publication do not achieve a C/N improvement as done by the present invention because a change of their complex index of refraction upon melting is outside the scope of the present invention.

JP-A 96926/1990 describes a recording carrier having a layer of a nonlinear optical material capable of achieving super-resolution. Layers of phase change materials are exemplified as the nonlinear optical material layer. They have substantially the same function as the mask layer of the present invention. A combination of a writable information layer containing a phase change material with a nonlinear layer containing a phase change material is also disclosed in the publication. However, the publication refers to nowhere the technical concept of suppressing a change of complex refractive index of the nonlinear optical material layer within a certain range. For example, it is described that GaSb and InSb are exemplary phase change materials for use in the nonlinear layer and irradiation of light with an intensity which does not cause a phase change can bring out a sufficient change of complex refractive index. However, since the real part of a complex refractive index experiences a substantial change with an increase of transmittance, these phase change materials raise the above-mentioned problem as opposed to the present invention. FIG. 17 of JP-A 96926/1990 illustrates the use of a phase change material together with an information layer and a nonlinear layer. Since the information layer is in close contact with the nonlinear layer, it is difficult to independently control the non-crystallizing linear velocity of the respective layers.

Illustrative Construction

The optical recording medium 1 is illustrated in FIG. 1 as comprising on a transparent substrate 2, a lower dielectric layer 3, a mask layer 4, an intermediate dielectric layer 5, a recording layer 6, an upper dielectric layer 7, a reflective layer 8, and a protective layer 9.

Transparent substrate 2

Since a light beam is directed to the recording layer 6 through the transparent substrate 2 for recording and reproduction, the substrate 2 is preferably formed of a material substantially transparent to a light beam, for example, resins and glass. For ease of handling and low cost, resins are preferred substrate materials. A choice may be made among various resins such as acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

Lower dielectric layer 3

The lower dielectric layer 3 is preferably provided on the transparent substrate 2 for the purpose of preventing thermal deformation of the substrate 2. During recording, reproducing and erasing steps, the mask layer 4 is melted. If the transparent substrate 2 is made of a less heat resistant resin, the heat associated with melting of the mask layer 4 can cause thermal deformation of the substrate 2. The lower dielectric layer 3 prevents such thermal deformation of the transparent substrate 2. The lower dielectric layer 3 has another function of controlling the cooling rate of the mask layer 4.

The lower dielectric layer 3 may be formed of any desired material which is suitably selected from various dielectric materials as will be described later in conjunction with the mask layer 4. Examples include $SiO_2$, a mixture of $SiO_2$ and ZnS, a so-called LaSiON material containing La, Si, O and N, a so-called SiAlON material containing Si, Al, O and N, a SiAlON material further containing Y, and a NdSiON material containing Nd, Si, O and N. A mixture of $ZnS-SiO_2$ and LaSiON are preferred for heat resistance upon melting of the mask layer 4.

The thickness of the lower dielectric layer 3 is not particularly limited and may be suitably determined so as to avoid thermal deformation of the transparent substrate 2. Preferably the lower dielectric layer 3 has a thickness of $[\lambda_R/(2n_3)] \pm 50$ nanometers wherein the reproducing light has a wavelength $\lambda_R$ (nanometers) and the lower dielectric layer has a refractive index $n_3$. Then the difference in reflectance between zones X and Y in FIG. 3 is increased and the difference in reflectance between zones Y and Z is decreased, which allows only the reflectance of zone X to be selectively reduced, achieving a noise reduction.

The lower dielectric layer 3 is preferably formed by vapor phase deposition methods such as sputtering and evaporation.

Mask layer 4

The mask layer 4 contains a mask material which increases its light transmittance when melted. The mask layer has a complex refractive index $(n_0-ik_0)$. The real part $n_0$ of the complex refractive index has a drop of up to 1.0, preferably up to 0.7 and the imaginary part $k_0$ has a drop of 0.25 to 1.0, preferably 0.45 to 0.80 when the mask material becomes amorphous or microcrystalline. These drops are based on the complex refractive index of the mask material which is crystalline. With greater drops of $n_0$, both noise and jitter increase for the previously mentioned reason. With smaller drops of $k_0$, the difference in reflectance between zones X and Y in FIG. 3 becomes smaller, resulting in low C/N. With greater drops of $k_0$, it is necessary to use a thinner mask layer which is slow in non-crystallizing linear velocity and thus difficult to re-crystallize.

The complex refractive index of the mask layer can be determined, for example, by forming the mask layer singly on a glass substrate and measuring a coefficient of spectral transmission at a plurality of wavelengths. In the present invention, a change of complex refractive index is determined based on the mask layer which is crystalline. In this regard, the difference between a crystalline state and an amorphous or microcrystalline state is judged by observation under a transmission electron microscope (TEM). In a TEM image, the mask layer which is amorphous or microcrystalline appears somewhat dark colored as a whole and few crystal grains sized more than about 5 nm are found. In contrast, when the mask layer is crystalline, crystal grains sized more than about 5 nm are distributed nearly uniformly. If the mask layer further contains a dielectric material as will be described later, relatively small crystal grains having a mean grain size of about 10 to 50 nm are often obtained. Grains of such a small size probably contribute to a restricted change of the real part $n_0$ of the complex refractive index and a selective change of extinction coefficient $k_0$.

It is noted that the complex refractive index of an amorphous or microcrystalline mask material is substantially equal to that of a molten mask material. This can be confirmed by measuring reflected light from a medium in which the mask material is amorphous or microcrystalline and examining the properties thereof.

The complex refractive index of the mask layer should show the above-mentioned change at the wavelength of reading light used. The wavelength of reading light used in the optical recording medium of the invention is not particularly limited and may be suitably selected from the range of about 400 to 850 nm, for example. The reading light which can be used in practice has a wavelength in the range of 460 to 850 nm. The present invention prefers that the above-mentioned change of complex refractive index is accomplished within this wavelength range.

In the first type of optical recording medium, the mask layer should resume a crystalline state after illumination and the recording layer should convert from a crystalline state to an amorphous or microcrystalline state after illumination. Then the mask layer should have a non-crystallizing linear velocity which is higher than the non-crystallizing linear velocity of the recording layer. The non-crystallizing linear velocity of the mask layer is preferably 4.5 to 7.0 m/s, more preferably 5.0 to 6.0 m/s. If the non-crystallizing linear velocity of the mask layer is too low, its difference from the non-crystallizing linear velocity of the recording layer would become so small that the linear velocity range within which high density reproduction is possible might become narrow. If the non-crystallizing linear velocity of the mask layer is too high, microcrystals would generate in the melt of the mask layer upon reproduction to induce scattering, resulting in a noise increase. Note that the non-crystallizing linear velocity of the mask and record layers can be determined by irradiating DC laser light of the same power as the recording light for melting the mask and record layers while gradually reducing the linear velocity of the medium, thereby determining the highest linear velocity at which crystallization takes place at the end of illumination. Alternatively, the non-crystallizing linear velocity is determined by finding the lowest linear velocity at which the layers become amorphous or microcrystalline at the end of illumination while increasing the linear velocity.

The term "non-crystallizing linear velocity" used herein is the lowest linear velocity necessary for the mask material in the mask layer or recording material in the recording layer of the medium to convert from a crystalline state to an amorphous or microcrystalline state. The linear velocity is the relative linear velocity of the medium relative to a beam spot of recording or reproducing light.

No particular limit is imposed on the mask material insofar as its complex refractive index changes as defined above. Preferably the mask material contains A, B, C, MI, and MII wherein A is silver (Ag) and/or gold (Au), B is indium (In), C is tellurium (Te) and/or selenium (Se), MI is antimony (Sb) and/or bismuth (Bi), and MII is at least one element selected from the group consisting of titanium (Ti), zirconium (Zr), hafnium (Hf), vanadium (V), niobium (Nb), tantalum (Ta), manganese (Mn), tungsten (W) and molybdenum (Mo). The atomic ratio of the respective elements in the mask material is represented by the formula:

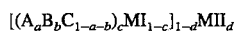

$$[(A_aB_bC_{1-a-b})_cMI_{1-c}]_{1-d}MII_d$$

wherein letters a, b, c and d are in the ranges: $0.01 \leq a < 0.50$, $0.01 \leq b < 0.50$, $0.30 \leq c \leq 0.70$, and $0.001 \leq d \leq 0.20$.

Elements A, B and C are preferably contained in the stoichiometric composition of chalcopyrite type compounds, that is, in the proportion of $ABC_2$, but may deviate therefrom as represented by $A_aB_bC_{1-a-b}$ in the above formula. With a and b outside the above-defined ranges, a phase change would provide an insufficient change of transmittance. With c below the above-defined range, it would be difficult to produce a change of complex refractive index within the above-defined range. With c beyond the above-defined range, a phase change would provide a too small change of transmittance, resulting in increased noise and jitter upon reproduction.

If d representative of the amount of MII is below the above-defined range, it would be difficult to produce a change of complex refractive index within the above-defined range and the first type of optical recording medium would be low in reliability after repeated overwriting. If d is beyond the above-defined range, it would be difficult to control the phase change velocity. Among MII elements, vanadium and titanium, especially vanadium, are effective for improving reliability. It is then preferred that at least one of Ti and V, especially V occupy at least 80 at %, especially 100 at % of the entire MII elements. The proportion of antimony and bismuth as MI elements is not critical.

In addition to the above-mentioned elements, the mask layer may further contain a trace amount of impurities such as Cu, Ni, Zn, Fe, O, N and C, preferably in a total amount of 0.05 at % or less.

In one preferred embodiment, the mask layer contains a dielectric material as well as the mask material. The dielectric material contained in the mask layer is not critical and may be selected from various transparent ceramics including silicon oxide such as $SiO_2$, silicon nitride such as $Si_3N_4$, zinc sulfide such as ZnS, and mixtures thereof, and various species of glass. Also useful are so-called LaSiON materials containing La, Si, O and N, so-called SiAlON materials containing Si, Al, O and N, and yttrium-containing SiAlON materials. Preferred dielectric materials have an index of refraction of at least 1.4, especially at least 2 in the wavelength range of 400 to 850 nm. This wavelength range includes 780 nm which is the wavelength used in current CD players and represents the range over which the optical recording medium of the invention is advantageously operated. Preferred examples of the dielectric material are a mixture of ZnS and $SiO_2$, a mixture of ZnS and $Si_3N_4$, a mixture of ZnS and $Ta_2O_5$, and LaSiON. Preferably the mask layer contains the mask material and the dielectric material such that the dielectric material is up to 25% by volume, especially 10 to 22% by volume of the mask material and the dielectric material combined. If the proportion of the dielectric material (dielectric material/(mask material+dielectric material)) is too low, the mask layer would have a too high coefficient of extinction $k_0$ and then the mask layer should be thin, resulting in a slow non-crystallizing linear velocity. If the proportion of the dielectric material is too high, the mask layer would have a too low coefficient of extinction $k_0$, resulting in a smaller difference in reflectance between zones X and Y in FIG. 3.

It is understood that in the mask layer, the dielectric material is not melted when the mask material is melted.

In general, the mask material has a refractive index $n_0$ of about 4.0 to 5.5 in crystalline state and about 3.0 to 4.5 in amorphous or microcrystalline state and a coefficient of extinction $k_0$ of about 0.75 to 3.0 in crystalline state and about 0.50 to 2.0 in amorphous or microcrystalline state, all in the above-mentioned wavelength range. A mask layer consisting of a mask material/dielectric material mixture= 3/1 in volume ratio have a $n_0$ of about 4.0 to 4.5 in crystalline state and about 3.4 to 3.8 in microcrystalline or amorphous state and a $k_0$ of about 1.00 to 1.50 in crystalline state and about 0.50 to 0.75 in amorphous or microcrystalline state.

Beside the composition shown by the above formula, the invention may use $Ge_2Sb_2Te_5$ as the mask material, for example. In this case, inclusion of dielectric material in the mask layer is essential in order to produce a change of complex refractive index within the scope of the present invention.

Preferably the mask layer has a thickness of about 7 to 100 nm, more preferably about 10 to 100 nm, most preferably about 15 to 50 nm. A too thin mask layer would provide an insufficient masking effect. If the mask layer is too thick, the reproducing light transmitted by the melt of the mask layer would undergo a too much phase change, resulting in an insufficient difference in reflectance between zones X and Y in FIG. 3.

The mask layer may be formed by any desired method, for example, sputtering and evaporation. A mask layer containing both a mask material and a dielectric material is preferably formed by a multiple source sputtering technique using a plurality of targets, typically a target of mask material and a target of dielectric material. With these targets disposed to face a transparent substrate, sputtering is carried out while rotating the substrate relative to the targets. The rotational speed of the substrate relative to the targets preferably ranges from 1 to 10 rpm. A slower speed would fail to achieve uniform dispersion of both the materials in the layer whereas a faster speed would provide a high degree of dispersion to inhibit crystal growth upon crystallization. Alternatively, a composite target containing both mask and dielectric materials may be used.

The mask layer formed by sputtering is generally believed as having a structure wherein particles of the dielectric material are dispersed in the mask material. This can be confirmed by means of a transmission electron microscope. The dielectric material in the mask layer usually has a particle size of about 10 to 50 nm.

Intermediate dielectric layer 5

The intermediate dielectric layer 5 is provided for separating the mask layer 4 and the recording layer 6. The material of which the intermediate dielectric layer 5 is made is not particularly limited and may be suitably selected from the dielectric materials set forth in conjunction with the mask layer 4. Since the mask layer and recording layer are repeatedly melted and crystallized below and above the intermediate dielectric layer 5, the layer 5 should preferably be formed of a dielectric material having higher resistance to thermal impact, for example, $ZnS$-$SiO_2$ mixtures, LaSiON, and $AlN$-$ZnS$-$SiO_2$.

Preferably the intermediate dielectric layer has a thickness of about 10 to 250 nm, more preferably about 80 to 250 nm, most preferably about 100 to 200 nm. A too thin intermediate dielectric layer would not withstand thermal impact, leading to a reduced number of repeatable overwrite cycles. If the intermediate dielectric layer is too thick, the recording layer of the second type of optical recording medium would fail to fully utilize the heat associated with melting of the mask layer upon recording, resulting in low recording sensitivity.

The intermediate dielectric layer 5 is preferably formed by vapor phase deposition methods such as sputtering and evaporation.

Recording layer 6

The recording layer 6 contains a recording material which allows for recording of information by changing its crystallographic structure upon exposure to recording light, that is, a phase change type recording material.

Preferably the recording layer has a non-crystallizing linear velocity of about 2.4 to 4.5 m/s. If the non-crystallizing linear velocity of the recording layer is too slow, the percent erasion upon overwriting would be aggravated, resulting in increased noise. If the non-crystallizing linear velocity of the recording layer is too fast, the differential reflectance would be small in the case of the first type and record marks of crystalline nature would be increased in size to introduce distortion in signal wavelength in the case of the second type of optical recording medium.

The recording layer may be formed of any desired material which is generally selected from conventional phase change type recording materials. A recording material of the following composition is preferred because of good C/N at a low linear velocity and acceptable overwrite repetition. The preferred recording material contains A, B, C, MI, and MII wherein A is silver and/or gold, B is indium, C is tellurium and/or selenium, MI is antimony and/or bismuth, and MII is at least one element selected from the group consisting of titanium, zirconium, hafnium, vanadium, niobium, tantalum, manganese, tungsten and molybdenum. The atomic ratio of the respective elements in the recording material is represented by the formula:

$$[(A_eB_fC_{1-e-f})_gMI_{1-g}]_{1-h}MII_h$$

wherein letters e, f, g and h are in the ranges: $0.01 \leq e < 0.50$, $0.01 \leq f < 0.50$, $0.30 \leq g \leq 0.70$, and $0.001 \leq h \leq 0.20$.

Elements A, B and C are preferably contained in the stoichiometric composition of chalcopyrite type compounds, that is, in the proportion of $ABC_2$, but may deviate therefrom as represented by $A_eB_fC_{1-e-f}$ in the above formula. With e and f outside the above-defined ranges, a phase change produces an insufficient change of reflectivity. With g below the above-defined range, the crystal transition rate would become so high that no satisfactory C/N would be achieved at a low linear velocity in the case of the first type and the repetitive recording capability would become poor. With g beyond the above-defined range, a phase change would produce a too small change of reflectivity to insure a reflectivity difference.

If h representative of the amount of MII is below the above-defined range, the crystal transition rate would become so high that no satisfactory C/N would be achieved when long wavelength (or low frequency) signals such as 11T signals are recorded at a low linear velocity and the repetitive recording capability would be lost. If h is beyond the above-defined range, recording characteristics would become too low to insure an enough intensity of signals. Among MII elements, titanium and vanadium, especially Ti is more effective for reducing the crystal transition rate. For improving reliability under severe conditions such as high temperature/high humidity conditions, vanadium and titanium, especially V are more effective. Accordingly, it is preferred that at least one of titanium and vanadium, especially V occupy at least 80 at %, especially 100 at % of the total of MII elements. The proportion of antimony and bismuth as MI elements is not critical.

In addition to the above-mentioned elements, the recording layer may further contain a trace amount of impurities such as Cu, Ni, Zn, Fe, O, N and C, preferably in a total amount of 0.05 at % or less.

In one preferred embodiment, the recording layer contains a dielectric material as well as the recording material. Preferably the recording layer contains the recording material and the dielectric material such that the dielectric material is up to 25% by volume, more preferably up to 10% by volume, especially up to 8% by volume of the recording material and the dielectric material combined. By reducing the coefficient of extinction of the recording layer, the dielectric material allows the recording layer to be increased in thickness. This results in an increased interference and hence a high modulation. Where such an effect is necessary, the proportion of the dielectric material should preferably be 2% by volume or more. If the proportion of the dielectric material in the recording layer is too high, the recording layer would become low in coefficient of extinction, reflectivity difference concomitant with a phase change, and modulation.

Besides, $(Ge_2Sb_2Te_5)_xSb_{1-x}$ may be used as the recording material. A recording layer containing it as a main component has a non-crystallizing linear velocity which is controllable in terms of Sb although an increased amount of Sb leads to a loss of reliability. Additionally, $(Ge_2Sb_2Te_5)_xSb_{1-x}$ is more difficult to control a non-crystallizing linear velocity than the above-mentioned preferred materials.

The recording layer may have any desired thickness although a thickness of about 10 to 200 nm, especially about 15 to 150 nm is preferred for reflectivity and modulation.

The recording layer may be formed by the same process as the mask layer.

Upper dielectric layer 7

The upper dielectric layer 7 is preferably provided on the recording layer 6 for the purpose of preventing thermal deformation of the reflective layer 8 by heating of the recording layer 6. The upper dielectric layer 7 has another function of controlling the cooling rate of the recording layer 6. The material of which the upper dielectric layer 7 is made is not particularly limited and may be suitably selected from the dielectric materials described in conjunction with the intermediate dielectric layer. Those dielectric materials having a relatively high heat transfer rate are preferred for increased cooling effect. Additionally the preferred dielectric materials should be resistant to deformation and rupture by thermal impact because the upper dielectric layer receives repetitive thermal impact. Preferred dielectric materials are $ZnS-SiO_2$ and $AlN-ZnS-SiO_2$.

Preferably the upper dielectric layer has a thickness of about 8 to 30 nm, more preferably about 15 to 25 nm. A too thin upper dielectric layer would fail by repetitive thermal impact upon recording. If the upper dielectric layer is too thick, the recording layer would be slow in cooling rate, failing to define good record marks and provide high C/N.

The upper dielectric layer 7 is preferably formed by vapor phase deposition methods such as sputtering and evaporation.

Reflective layer 8

The reflective layer 8 has a primary function as a heat sink for increasing the cooling rate of the recording layer 6 and an additional function of increasing the quantity of light reflected toward the transparent substrate 2.

The reflective layer 8 may be formed of any desired material, typically high reflectivity metals, for example, Al, Au, Ag, Pt, and Cu alone or alloys containing at least one of these metals. The reflective layer is preferably about 30 to 150 nm thick. With a thickness below this range, the recording layer would have a too low cooling rate to form definite record marks of amorphous or microcrystalline nature and the reflectivity would be low. A thickness beyond this range would provide no additional improvement in reflectivity and add to the cost. The reflective layer is preferably formed by vapor phase deposition methods such as sputtering and evaporation.

Protective layer 9

The protective layer 9 is preferably provided for improving scratch resistance and corrosion resistance. Preferably the protective layer is formed of organic materials, typically radiation curable compounds or compositions which are cured with radiation such as electron and UV radiation. The protective layer is generally about 0.1 to 100 μm thick and may be formed by conventional techniques such as spin coating, gravure coating, spray coating, and dipping.

Recording light is preferably irradiated in pulses. When a single signal is recorded with at least two shots of illumination, it is possible to restrain accumulation of heat in a record spot or site and expansion of the trailing edge of the record spot (which is known as a tear drop phenomenon), leading to an improved C/N. Pulsative illumination also improves percent erasion.

The power of recording, reproducing and erasing light may be empirically determined. Often the recording light has a power Pw of 12 to 20 mW, the reproducing light has a power Pr of 3 to 6 mW, and the erasing light has a power Pe between Pw and Pr.

The optical recording medium of the invention may be operated at any desired linear velocity relative to light beam spots upon recording, reproducing and erasing. The relative linear velocity is suitably set so as to enable recording, reproducing and erasing in the above-described manner. For example, the linear velocity of the medium relative to recording and reproducing light may be less than the non-crystallizing linear velocity of the mask layer.

EXAMPLE

Examples of the present invention are given below by way of illustration and not by way of limitation.

Example 1

A disk-shaped transparent substrate 2 was injection molded from polycarbonate to a diameter of 133 mm and a thickness of 1.2 mm while grooves were simultaneously formed on one major surface thereof at a pitch of 1.0 μm. On the grooved surface of the substrate 2, a lower dielectric layer 3, a mask layer 4, an intermediate dielectric layer 5, a recording layer 6, an upper dielectric layer 7, a reflective layer 8 and a protective layer 9 were successively formed, fabricating an optical recording disc sample of the configuration shown in FIG. 1.

The lower dielectric layer 3 was of $ZnS$-$SiO_2$ and 130 nm thick. The intermediate dielectric layer 5 was of $ZnS$-$SiO_2$ and 180 nm thick. The upper dielectric layer 7 was of $ZnS$-$SiO_2$ and 20 nm thick. All these dielectric layers were formed by sputtering. The $ZnS$-$SiO_2$ material had a molar ratio of $ZnS$ to $SiO_2$ of 0.85:0.15 and a refractive index of 2.3 at wavelength 780 nm.

The mask layer 4 was 30 nm thick and the recording layer 6 was 20 nm thick and both the layers were formed by sputtering. Table 1 shows the composition of the respective layers. The target used was an antimony target having chips of Ag, In, Te and V attached to the surface thereof. In samples containing a dielectric material in a layer, an additional target as used for forming the dielectric layers was used together with the antimony target. The layer was formed by sputtering while rotating the transparent substrate at 5 rpm. RF sputtering was applied to the dielectric material target whereas DC sputtering was applied to the other targets. Table 1 also shows the volume proportion of the dielectric material in the respective layers. Also changes of the complex refractive index ($n_0$–$ik_0$) of the mask layer upon melting, more particularly drops of $n_0$ and $k_0$ at wavelength 780 nm were measured by the previously described procedure. The non-crystallizing linear velocity of the mask layer and the recording layer was also measured. The results are shown in Table 1.

The reflective layer 8 was formed to a thickness of 100 nm by sputtering a Au target. The protective layer 9 was formed by applying a UV curable resin by spin coating and exposing to UV radiation for curing. The protective layer was 5 μm thick at the end of curing.

Next, for initialization, laser light of 10 mW was irradiated to the amorphous mask and recording layers, thereby causing the mask and recording layers to crystallize.

While each disc sample was rotated at a linear velocity of 2.8 m/s, the disc sample was recorded with signals of 3 and 5 MHz and then reproduced for measuring the C/N of the reproduced signals. The recording light beam had a power Pw of 18 mW, the erasing light beam had a power Pe of 6.0 mW, and the reproducing light beam had a power Pr of 5.4 mW. All these light beams had the wavelength of 780 nm.

Comparative disc samples were prepared by the same procedure as above except that the mask layer and intermediate dielectric layer were omitted. They were also measured for C/N. An increase of C/N of an inventive sample relative to a corresponding comparative sample is also reported in Table 1. The comparative samples had a C/N ratio of about 10 dB for 3-MHz signals and about 1 to 2 dB for 5-MHz signals.

The results are shown in Table 1.

TABLE 1

| | | Mask layer | | | |
|---|---|---|---|---|---|
| Sample | Mask material composition | Dielectric material | Drop of complex refractive index | | Non-crystallizing linear |
| No. | (at %) | (vol %) | $n_0$ | $K_0$ | velocity (m/s) |
| 1 | In(4.1)Ag(14.5)Sb(51.8)Te(27.9)V(1.7) | ZnS—$SiO_2$ (10) | 0.6 | 0.77 | 5.0 |
| 2 | In(4.7)Ag(15.2)Sb(50.3)Te(28.9)V(0.9) | ZnS—$SiO_2$ (15) | 0.7 | 0.61 | 5.3 |
| 3 | In(3.5)Ag(16.1)Sb(52.5)Te(27.3)V(0.6) | ZnS—$SiO_2$ (20) | 0.5 | 0.60 | 5.8 |
| 4 | In(4.1)Ag(14.5)Sb(51.8)Te(27.9)V(1.7) | ZnS—$SiO_2$ (3) | 1.50* | 1.10* | 4.1 |

| | | Recording layer | | | |
|---|---|---|---|---|---|
| Sample | Recording material composition | Dielectric material | Non-crystallizing linear | C/N increase (dB) | |
| No. | (at %) | (vol %) | velocity (m/s) | @ 3 MHz | @ 5 MHz |
| 1 | In(4.1)Ag(14.5)Sb(51.8)Te(27.9)V(1.7) | — | 2.5 | 32 | 26 |
| 2 | In(4.7)Ag(15.2)Sb(50.3)Te(28.9)V(0.9) | — | 2.5 | 30 | 22 |
| 3 | In(3.5)Ag(16.1)Sb(52.5)Te(27.3)V(0.6) | ZnS—$SiO_2$ (5) | 2.5 | 34 | 25 |
| 4 | In(3.5)Ag(16.1)Sb(52.5)Te(27.3)V(0.6) | ZnS—$SiO_2$ (10) | 2.5 | 15 | 2 |

*outside the scope of the invention

The effectiveness of the invention is evident from Table 1. Very high C/N ratios are achieved when the drops of the complex refractive index of the mask layer upon melting are within the scope of the present invention. Sample No. 4 has low C/N because of an excessive drop of $n_0$.

Additional experiments were carried out by replacing some components of the mask material and/or the recording material. Equivalent results were obtained when at least a part of Sb was replaced by Bi. Equivalent results were obtained when at least a part of V was replaced by Ti. When at least a part of Ag was replaced by Au, the recording layer was somewhat accelerated in non-crystallizing linear velocity as compared with the single use of Ag, but equivalent results to the single use of Ag was obtained by increasing the amount of V added. Equivalent results were obtained when at least a part of V was replaced by Zr, Hf, Nb, Ta, Mn, W or Mo or a mixture thereof.

The inventive samples shown in Table 1 and comparative samples free of vanadium were stored under conditions of 80° C. and RH 80% for examining the degradation of the recording layer. The inventive samples with V added remained unchanged over 200 hours of storage whereas the comparative samples exhibited degradation of the recording layer after 20 hours of storage. More specifically, a recorded portion which should be amorphous started crystallization, approaching to the reflectivity of an unrecorded or crystalline state.

Although the foregoing examples related to the first type of optical recording medium, it was found that high C/N were achieved when the invention was applied to the second type of optical recording medium wherein crystalline record marks were formed.

All these results prove that the present invention achieve significant improvements.

Japanese Patent Application No. 341818/1993 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording medium comprising a mask layer, an intermediate dielectric layer, a recording layer, and a reflective layer on a transparent substrate in the described order, wherein said recording layer contains a recording material which changes its crystallographic structure upon exposure to recording light for recording information, and said mask layer contains a mask material which increases its light transmittance when melted, and said mask layer has a complex refractive index $(n_0-ik_0)$, of which the real part $n_0$ has a drop of up to 1.0 and the imaginary part $k_0$ has a drop of 0.25 to 1.0 when the mask material becomes amorphous or microcrystalline.

2. The optical recording medium of claim 1 wherein provided that the minimum of a relative linear velocity at which a material can convert to an amorphous or microcrystalline state after exposure to a light beam is designated a non-crystallizing linear velocity, the non-crystallizing linear velocity of said mask layer is higher than the non-crystallizing linear velocity of said recording layer.

3. The optical recording medium of claim 2 wherein the non-crystallizing linear velocity of said recording layer is 2.4 to 4.5 m/s.

4. The optical recording medium of claim 1 wherein provided that the minimum of a relative linear velocity at which a material can convert to an amorphous or microcrystalline state after exposure to a light beam is designated a non-crystallizing linear velocity, the relative linear velocity of the medium relative to recording and reproducing light is less than the non-crystallizing linear velocity of said mask layer.

5. The optical recording medium of claim 4 wherein the non-crystallizing linear velocity of said recording layer is 2.4 to 4.5 m/s.

6. The optical recording medium of claim 1 wherein said mask material contains A, B, C, MI, and MII wherein A is at least one of silver and gold, B is indium, C is at least one of tellurium and selenium, MI is at least one of antimony and bismuth, and MII is at least one element selected from the group consisting of titanium, zirconium, hafnium, vanadium, niobium, tantalum, manganese, tungsten and molybdenum, the atomic ratio of the respective elements in the mask material being represented by the formula:

$$[(A_aB_bC_{1-a-b})_cMI_{1-c}]_{1-d}MII_d$$

wherein letters a, b, c and d are in the ranges: $0.01 \leq a < 0.50$, $0.01 \leq b < 0.50$, $0.30 \leq c \leq 0.70$, and $0.001 \leq d \leq 0.20$.

7. The optical recording medium of claim 6 wherein said mask layer further contains a dielectric material.

8. The optical recording medium of claim 1 wherein said mask layer further contains a dielectric material.

9. The optical recording medium of claim 8 wherein in said mask layer, the dielectric material occupies up to 25% by volume of the total of the mask and dielectric materials.

10. The optical recording medium of claim 1 wherein said recording material contains A, B, C, MI, and MII wherein A is at least one of silver and gold, B is indium, C is at least one of tellurium and selenium, MI is at least one of antimony and bismuth, and MII is at least one element selected from the group consisting of titanium, zirconium, hafnium, vanadium, niobium, tantalum, manganese, tungsten and molybdenum, the atomic ratio of the respective elements in the recording material being represented by the formula:

$$[(A_eB_fC_{1-e-f})_gMI_{1-g}]_{1-h}MII_h$$

wherein letters e, f, g and h are in the ranges: $0.01 \leq e < 0.50$, $0.01 \leq f < 0.50$, $0.30 \leq g \leq 0.70$, and $0.001 \leq h \leq 0.20$.

11. The optical recording medium of claim 10 wherein said recording layer further contains a dielectric material.

12. The optical recording medium of claim 11 wherein in said recording layer, the dielectric material occupies up to 25% by volume of the total of the recording and dielectric materials.

13. The optical recording medium of claim 1 wherein said mask layer is 7 to 100 nm thick.

14. The optical recording medium of claim 1 wherein said intermediate dielectric layer is 10 to 200 nm thick.

15. The optical recording medium of claim 1 which further includes a lower dielectric layer between the transparent substrate and the mask layer.

16. The optical recording medium of claim 15 wherein said lower dielectric layer has a thickness of $[\lambda_R/(2n_3)] \pm 50$ nm wherein the reproducing light has a wavelength $\lambda_R$ and said lower dielectric layer has a refractive index $n_3$.

17. The optical recording medium of claim 1 which further includes an upper dielectric layer between the recording layer and the reflective layer.

18. The optical recording medium of claim 1 which further includes a protective layer containing an organic material on the reflective layer.

19. The optical recording medium of claim 1 wherein the recording layer includes an unrecorded region which is crystalline and recorded marks which are amorphous or microcrystalline.

20. The optical recording medium of claim 1 wherein the recording layer includes an unrecorded region which is amorphous or microcrystalline and recorded marks which are crystalline.

* * * * *